United States Patent
Fujii et al.

[19]

[11] Patent Number: 6,119,150
[45] Date of Patent: Sep. 12, 2000

[54] MESSAGE PASSING DISTRIBUTED SHARED MEMORY SYSTEM THAT ELIMINATES UNNECESSARY SOFTWARE CONTROLLED CACHE FLUSHES OR PURGES

[75] Inventors: Hiroaki Fujii, Kokubunji; Tadaaki Isobe; Makoto Koga, both of Hadano; Hideya Akashi, Kodaira, all of Japan

[73] Assignee: Hitachi, Ltd., Tokyo, Japan

[21] Appl. No.: 08/789,184

[22] Filed: Jan. 24, 1997

[30] Foreign Application Priority Data

Jan. 26, 1996 [JP] Japan .................................. 8-011540

[51] Int. Cl.[7] .......................... G06F 15/167; G06F 13/00
[52] U.S. Cl. ............................................. 709/213; 711/141
[58] Field of Search ................................... 711/141, 142, 711/143; 709/213–216

[56] References Cited

U.S. PATENT DOCUMENTS

| | | | |
|---|---|---|---|
| 5,303,362 | 4/1994 | Butts, Jr. et al. | 711/127 |
| 5,606,686 | 2/1997 | Tarui et al. | 711/121 |
| 5,680,576 | 10/1997 | Laudon | 711/145 |
| 5,692,149 | 11/1997 | Lee | 711/133 |
| 5,706,463 | 1/1998 | Ebrahim et al. | 711/120 |
| 5,749,095 | 5/1998 | Hagersten | 711/141 |
| 5,765,196 | 6/1998 | Liencres et al. | 711/143 |
| 5,787,476 | 6/1998 | Laudon et al. | 711/141 |
| 5,787,480 | 6/1998 | Scales et al. | 711/148 |
| 5,813,028 | 9/1998 | Agarwala et al. | 711/118 |
| 5,864,671 | 1/1999 | Hagersten et al. | 709/213 |
| 5,920,893 | 7/1999 | Nakayama et al. | 711/147 |
| 5,923,855 | 7/1999 | Yamazaki | 709/248 |
| 5,933,598 | 8/1999 | Scales et al. | 709/216 |
| 5,987,571 | 11/1999 | Shibata et al. | 711/141 |
| 6,003,116 | 12/1999 | Morita et al. | 711/141 |
| 6,038,644 | 3/2000 | Irie et al. | 711/141 |
| 6,044,438 | 3/2000 | Olnowich | 711/130 |

OTHER PUBLICATIONS

D. Lenoski, et al, "The Stanford Dash Multiprocessor", Computer, Mar. 1992, pp. 63–79.

*Primary Examiner*—Zarni Maung
*Assistant Examiner*—Andrew Caldwell
*Attorney, Agent, or Firm*—Antonelli, Terry, Stout & Kraus, LLP

[57] ABSTRACT

An instruction processor is employed which performs a cache coherence control according to a request from the storage controller. The storage controller is provided with a cache coherence control processing circuit, which performs the cache coherence control for the addresses which are the destinations of main memory accesses occurring with a data transfer. At the same time, the cache coherence control processing circuit performs the cache coherence control processing once for each cache line in the process of data transfer. The cache coherence control processing performed by software in connection with data transfer is obviated, improving the data transfer efficiency including the cache memory control and reducing limitations on program.

6 Claims, 3 Drawing Sheets

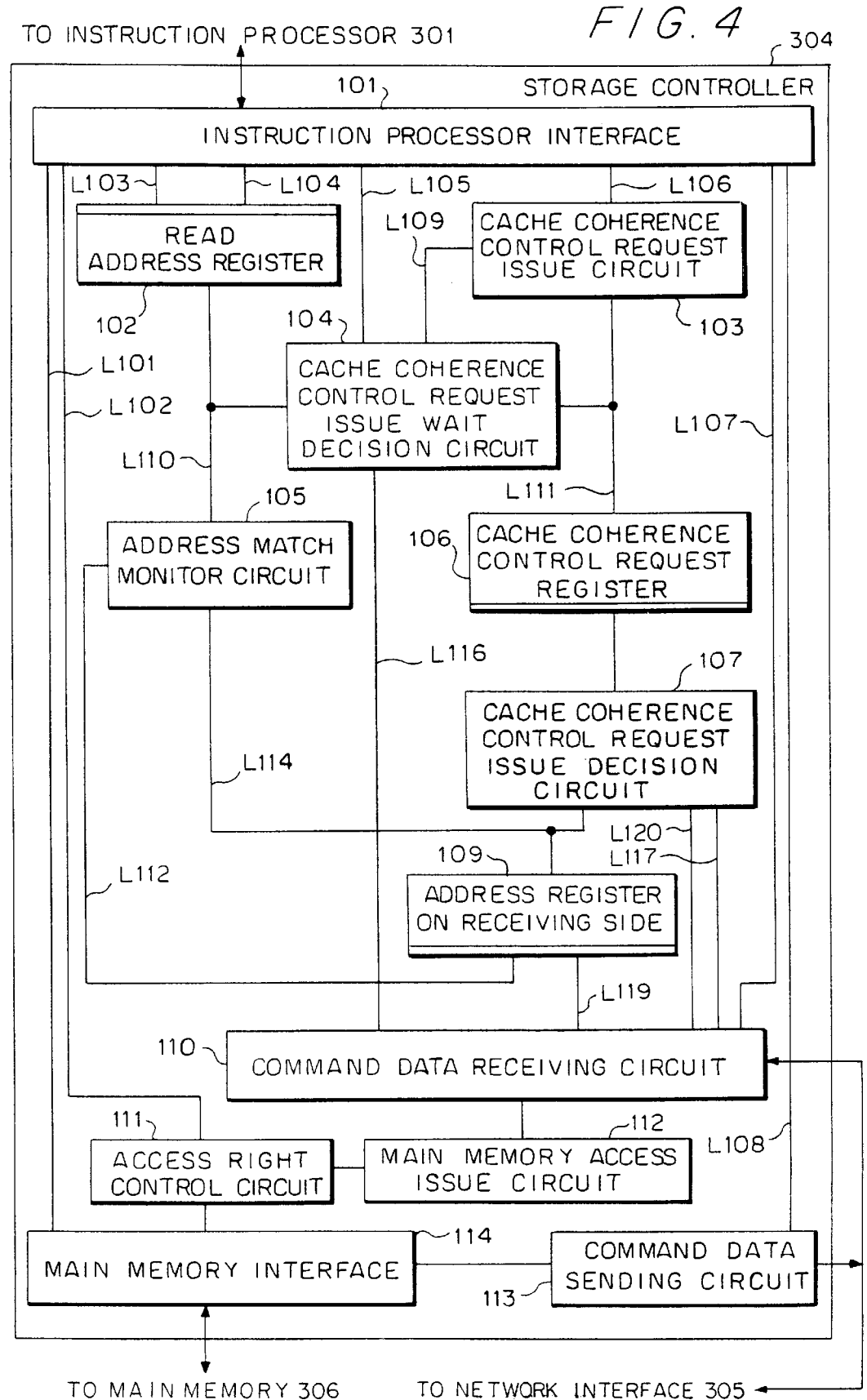

MESSAGE PASSING DISTRIBUTED SHARED MEMORY SYSTEM THAT ELIMINATES UNNECESSARY SOFTWARE CONTROLLED CACHE FLUSHES OR PURGES

BACKGROUND OF THE INVENTION

The present invention relates to a parallel processor system with distributed memories. More particularly, the present invention relates to a message passing parallel processor method and apparatus that realizes coherence control on main memory locations storing data to be sent and received data to ensure that the contents of a cache memory and main memory are identical when data is transferred among processor elements that form the message passing parallel processor system.

Demands on computers for faster processing performance have prompted the advent of a parallel processor system using a plurality of instruction processors in combination. The parallel processor system designed for applications in so-called supercomputing fields, such as science and technology computing, has hundreds to thousands of processors interconnected via an inter-processor network. The parallel processor system of this configuration adopts a memory system in which instruction processors are each provided with an independent main memory with all these main memories systematically controlled. Such a memory system is generally called a distributed memory system.

In the distributed memory type parallel processor systems, when an instruction processor is to reference data on a main memory controlled by other instruction processors, the reference is achieved by data transfer between the instruction processors via an inter-processor network. The distributed memory parallel processor systems are classed into two groups, a distributed shared memory type and a message passing type, according to how this data transfer is realized.

In the distributed shared memory type parallel processor systems, the execution of load/store instructions (machine language instructions) involving destination addresses of main memory locations in other instruction processors automatically invokes data transfer. The amount of data transferred at this time is approximately a word handled by the load/store instruction. The amount may be several tens of words depending on the system. In the message passing type parallel computer, data transfer is realized by explicitly activating a data transfer mechanism by a program procedure. The amount of data transferred at this time, though limited by hardware, is arbitrary within this limit and a large amount of data, more than several kilo-words, can be transferred.

The distributed shared memory type and the message passing type differ in the data transfer starting mechanism and the amount of data transferred, as described above. The difference in the control mechanism becomes even wider when the instruction processors have a cache memory. In the distributed shared memory type parallel processor system, a coherence control on the cache memory and the main memory is automatically performed by hardware during the course of data transfer, as with bus-connected multiprocessors (symmetric multiprocessors: SMP). For example, a distributed shared memory type parallel processor system, named Dash, developed at Stanford University, as disclosed in "The Stanford Dash Multiprocessor", by D. Lenoshi, et al., IEEE Computer, March 1992, pp 63–79, realizes coherence control by adopting a directory method. Realizing such a control mechanism, however, is disadvantageous in terms of hardware cost. In the message passing type parallel processor system, the coherence control accompanying data transfer is not performed by hardware but instead explicitly performed by software. To describe in more detail, the data area to be transferred is erased from the cache memory before the data transfer by using a flush instruction or purge instruction in order to prevent disagreement in contents between the cache memory and main memory. The flush instruction, when expected and when data on the cache memory differs from that of the main memory, causes the system to copy back the cache memory content to the main memory and then erases the data location from the cache memory. The purge instruction when executed causes the system to erase a data location from the cache memory.

As described above, in the message passing type parallel processor system, the cache memory needs to be subjected to the explicit flush or purge processing by software before data transfer (send or receive operation) to prevent disagreement in contents between the cache memory and the main memory at time of data transfer. When considered in terms of data transfer performance, such software processing itself is a huge overhead (performance degradation factor) and the fact that the cache memory, which should normally be handled by hardware, needs to be recognized and controlled by software at time of data transfer constitutes a large limiting factor for a program or algorithm as a whole. These combine to lower the processing efficiency of the system.

SUMMARY OF THE INVENTION

The object of the present invention is to reduce software overhead and alleviate limitations on programs during data transfer in the message passing type parallel processor system.

The instruction processors used in a symmetric multiprocessor have a mechanism, for performing flush or purge processing, to control the cache memory by hardware according to transaction requests transferred via bus. The present invention is assumed to employ, as the instruction processors of a parallel processor system, instruction processors that control the cache memory by hardware according to the transaction requests received through bus.

The parallel processor system of the present invention has a circuit which successively issues to the instruction processors cache memory control flush or purge requests for destination or source address locations of the main memory accesses made during the send/receive operations while at the same time receiving or sending data during the data transfer processing. Utilizing the feature that the data transfer handles data stored in consecutive address locations, the parallel processor system of the present invention sets the number of times that the cache memory control request is issued to the instruction processor. Namely, the present invention controls issue of the cache memory control request such that the cache memory control request is issued one for each cache line, the unit for registration in the cache memory, thereby improving the efficiency of the data transfer including the cache memory control.

In more detail, the parallel processor system of the present invention having distributed memories includes a plurality of processors, each having an instruction processor, a main memory and a cache memory used to improve efficiency of access to the main memory, wherein data is written into the cache memory and the main memory at the same time, an inter-processor network interconnecting the processors, an erase circuit which, when the processor receives data through the inter-processor network, erases from the cache memory the content of a main memory location holding the receive data, and a circuit for writing the received data into the main memory after the erase operation by the erase circuit.

While reception from the inter-processor network of data is repeated for a series of address locations including a plurality of words and forming a unit for data copying from the main memory to the cache memory, the erase circuit erases the series of address locations from the cache memory only once before first received data for the series of address locations is written into the main memory. Once the series of address locations is erased from the cache memory, the erase circuit does not erase the series of address locations from the cache memory when it receives data for the series of address locations until the series of address locations is copied again to the cache memory. Further, when the series of address locations is copied again to the cache memory while the reception of data into the series of address locations continues, the erase circuit erases the series of address locations from the cache memory only once before first receive data following the copying again of the series of address locations to the cache memory is written into the main memory. Thereafter the erase circuit does not erase the series of address locations from the cache memory when it receives data for the series of address locations until the series of address locations is copied again to the cache memory.

The present invention also provides a parallel processor system with distributed memories having a plurality of processors, each having an instruction processor, a main memory and a cache memory used to improve efficiency of access to the main memory, wherein data is written usually into the cache memory and, when a copy back is requested, the data is written into the main memory. The parallel processor system further includes an inter-processor network interconnecting the processors, a first circuit which, when the content of the main memory location to store the data that the processor has received through the inter-processor network differs between the cache memory and the main memory, copies back the content of the main memory from the cache memory to the main memory and erases from the cache memory the content of the main memory to store the received data, and a second circuit for writing the receive data into the main memory after the erase operation by the first circuit.

Further, while reception of data is repeated for a series of address locations including a plurality of words and forming a unit for data copying from the main memory to the cache memory and when the content of the series of address locations on the cache memory differs from that of the main memory, the first circuit reflects the content of the series of address locations on the main memory and erases the series of address locations from the cache memory only once before first receive data for the series of address locations is written into the main memory. Thereafter, when the content of the series of address locations on the cache memory differs from that of the main memory when receive data for the series of address locations is received, the first circuit does not reflect the content of the series of address locations on the main memory nor erase the series of address locations from the cache memory until the series of address locations is copied again to the cache memory.

Further, when the series of address locations is copied again to the cache memory while data reception into the series of address locations continues and when the content of the series of address locations on the cache memory differs from that of the main memory, the first circuit reflects the content of the series of address locations on the main memory and erases the series of address locations from the cache memory only once before first received data following the copying again of the series of address locations to the cache memory is written into the main memory. Thereafter, when the content of the series of address locations on the cache memory differs from that of the main memory and when data for the series of address locations is received, the first circuit does not reflect the content of the series of address locations on the main memory nor erase the series of address locations from the cache memory until the series of address locations is copied again to the cache memory.

The present invention further provides a parallel processor system with distributed memories including a plurality of processors, each having an instruction processor, a main memory and a cache memory used to improve efficiency of access to the main memory, wherein data is written usually into the cache memory and, when a copy back is requested, the data is written into the main memory. The parallel processor system further includes an inter-processor network interconnecting the processors, a first circuit which, when the content of the main memory location to store the data that the processor sends through the inter-processor network differs between the cache memory and the main memory, copies back the content of the main memory from the cache memory to the main memory and erases from the cache memory the content of the main memory to store the data, and a second circuit for reading the data to be sent from the main memory after the erase operation by the first circuit.

While transmission of data is repeated from a series of address locations including a plurality of words and forming a unit for data copying from the main memory to the cache memory and when the content of the series of address locations on the cache memory differs from that of the main memory, the first circuit reflects the content of the series of address locations on the main memory and erases the series of address locations from the cache memory only once before first send data from the series of address locations is read from the main memory. Thereafter, when the content of the series of address locations on the cache memory differs from that of the main memory when the data to be sent is read from the series of address locations, the first circuit does not reflect the content of the series of address locations on the main memory nor erase the series of address locations from the cache memory until the series of address locations is copied again to the cache memory.

Further, when the series of address locations is copied again to the cache memory while data transmission from the series of address locations continues and when the content of the series of address locations on the cache memory differs from that of the main memory, the first circuit reflects the content of the series of address locations on the main memory and erases the series of address locations from the cache memory only once before first data to be sent following the copying again of the series of address locations to the cache memory is read from the main memory. Thereafter, when the content of the series of address locations on the cache memory differs from that of the main memory when the data to be sent is read from the series of address locations, the first circuit does not reflect the content of the series of address locations on the main memory nor erase the series of address locations from the cache memory until the series of address locations is copied again to the cache memory.

BRIEF DESCRIPTION OF THE DRAWINGS

The present invention will be more apparent from the following detailed description, when taken in conjunction with the accompanying drawings, in which:

FIG. 4 is a block diagram illustrating the configuration of the storage controller of the present invention.

DETAILED DESCRIPTION OF THE PREFERRED EMBODIMENTS

First Embodiment

Figure 2:
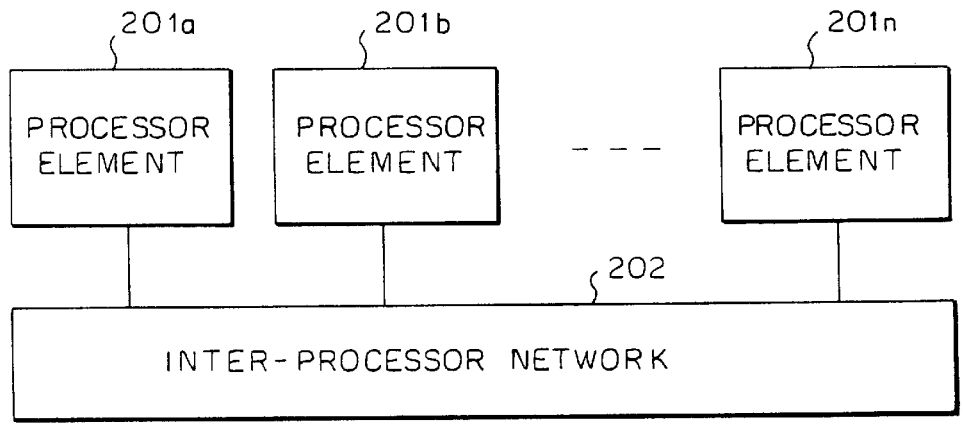
FIG. 2 is a block diagram illustrating the configuration of the message passing type parallel processor system of the present invention.

Embodiments of the present invention will be described by referring to the accompanying drawings. FIG. 2 illustrating an outline configuration of a parallel processor system of a message passing type. The message passing type parallel processor system has tens, hundreds or even thousands of processor elements 201 (201a, 201b, . . . , 201n), the processor elements 201 each being connected to an inter-processor network 202, through which they transfer data to and from other processor elements 201. There are a variety of configurations of the inter-processor network 202, and the present invention does not place any particularly limitation on the configuration of the inter-processor network 202.

The processor element 201 may be configured in a variety of ways. One example configuration is outlined in FIG. 3. Its main constituent elements include a calculation processor (also called an instruction processor) 301, a cache memory (it may also be called simply a cache) 302 accompanying the instruction processor 301, a storage controller 304 that makes an access to an appropriate memory device according to a data access request issued by the instruction processor 301 and a network interface 305 and I/O interface 303 described later, a main memory 306 controlled by the storage controller 304, a network interface 305 connected to the inter-processor network 202 and adapted to control data transfer, and an I/O interface 303 that makes an access to an I/O device in response to a request from the storage controller 304. There may be a case where the I/O interface 303 is not provided depending on the configuration adopted.

In the processor element 201, the instruction processor 301 is a unit for executing programs and the network interface 305 is a unit that performs data transfer, namely message passing a feature of the message passing type parallel processor system according to instructions from the instruction processor 301 independently of the program processing done by the instruction processor 301. Because the instruction processor 301 and the network interface 305 operate independently of each other, the storage controller 304 processes a request from the instruction processor 301 to access the main memory 306 at the same time that it processes a request to access the main memory 306 made by the network interface 305 for data transfer. The present invention relates to a mechanism realized in the storage controller 304.

Assumptions made in the configuration of the present invention are explained below. First, the present invention is based on the assumption that it is applied to a message passing type parallel processor system. In the message passing type parallel processor system, when performing one data transfer, data send or receive, the network interface 305 issues to the storage controller 304 a main memory access request, whose access destination address is words that need only have a unit length required to access the main memory and that are either contiguous to one another or spaced a specified word distance (stride) but, in either case, are in an ascending order.

Figure 3:
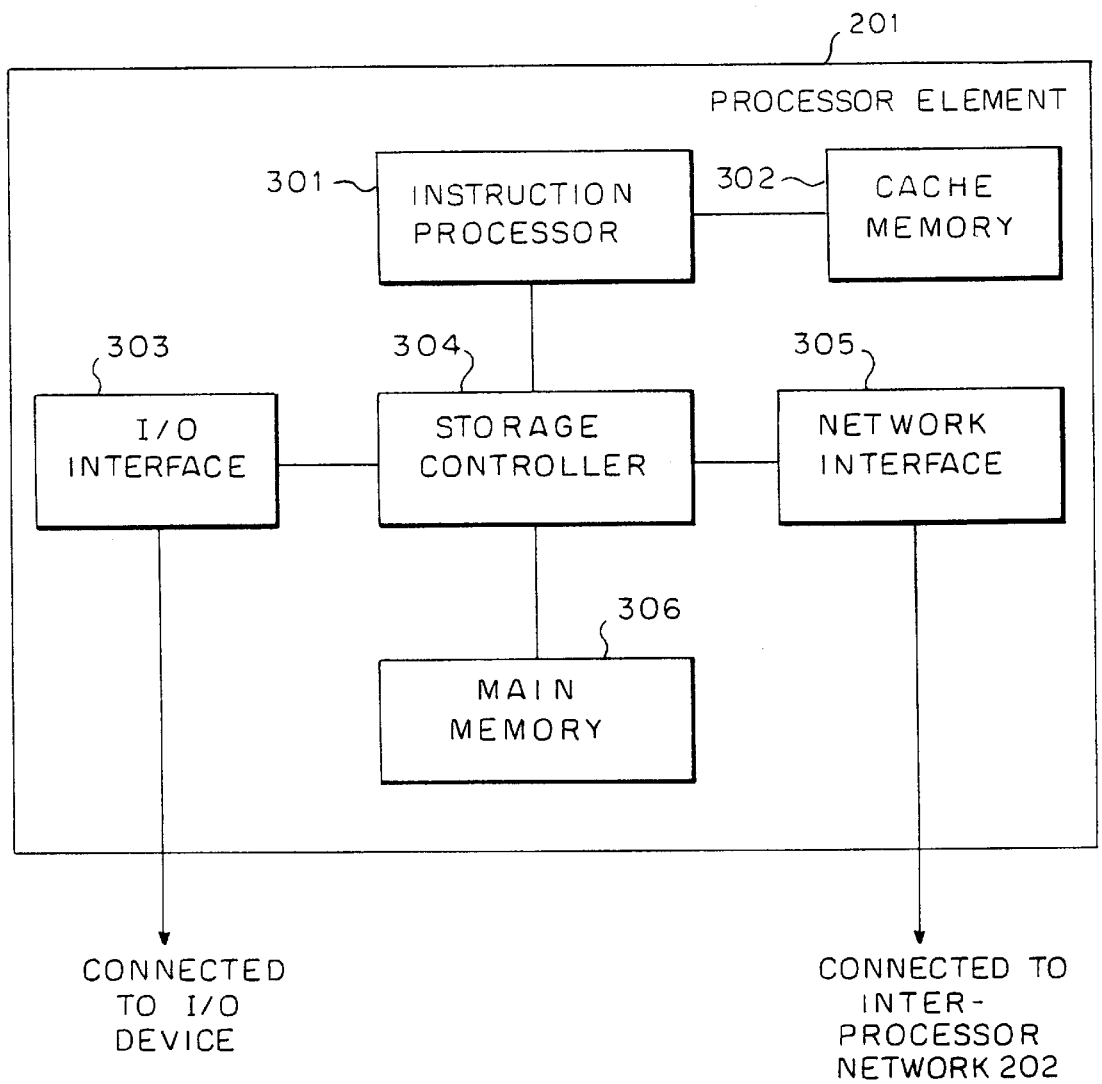
FIG. 3 is a block diagram illustrating the outline configuration of a processor element of the present invention.

Another assumption of the present invention is that the instruction processor 301 has a mechanism cache coherence mechanism, to control the cache memory 302 in response to an external request, in the case of FIG. 3, from the storage controller 304, by hardware.

Further, another point to be noted before presenting detailed description of the configuration of the present invention is the way to implement the cache memory 302. There are two ways of implementing the cache memory 302, a store through method and a copy back method. This classification depends on how the result of execution of the store instruction by the instruction processor 301 is reflected on the main memory 306. The store through method reflects the result of the store both on the cache memory 302 and on the main memory 306 simultaneously each time the store instruction is executed by the instruction processor 301. The copy back method, on the other hand, reflects the store result only on the cache memory 302 when the store instruction is executed by the instruction processor 301 and does not reflect it on the main memory 306 at that time. In the copy back method, the time when the store result is reflected on the main memory 306 is only when a copy back instruction from the cache memory 302 to the main memory 306 is executed or when the cache-to-main-memory copy back requested from outside the instruction processor 301 is executed.

The configuration of the embodiments of the present invention varies slightly depending on how the cache memory 302 is implemented. First, explanation will be given about the configuration when a store through type cache memory 302 is employed. The configuration with a copy back type cache memory 302 will be described later as a variation.

In cases where the cache memory 302 adopts a store through method, when an instruction processor 301 requests the network interface 305 to start a data transfer to another processor element 201, the data on the main memory 306 is the latest data to be sent out because the result of store operation is always reflected on the main memory 306. Hence, in sending data, there is no need to perform a control to match the content of the main memory 306 with the content of the cache memory 302 (coherence control).

As to data reception, this occurs irrespective of the operation of the instruction processor 301 and it is thus necessary to perform the coherence control on the main memory 306 and the cache memory 302. A coherence control mechanism implemented in the storage controller 304 for the store through type cache memory 302 of this embodiment will be explained by referring to FIG. 4. In the following, descriptions of operations associated with the I/O interface 303 are omitted as they are not particularly relevant to this subject. FIG. 4 therefore does not show the processing components associated with the I/O interface 303.

FIG. 4 illustrates the detailed configuration of the storage controller 304. In FIG. 4, an instruction processor interface 101 receives a processing request for the storage controller 304 from the instruction processor 301 and then transfers read data, the result of the requested processing, to the instruction processor 301. Or it receives a processing request for the instruction processor 301 from the network interface 305 and passes the request to the instruction processor 301. The processing request for the instruction processor 301 from the network interface 305 may, for example, be an interrupt request to indicate the end of data sending. Such a request is received by a command data receiving circuit 110 in the storage controller 304, which decodes the content of the request and then transfers it via a signal line L107 to the instruction processor interface 101, from which it is sent to the instruction processor 301.

The command data receiving circuit 110 and a command data sending circuit 113 are, respectively, a circuit to accept processing requests from the network interface 305 and a circuit to transfer to the network interface 305 the result of processing requested by the network interface 305, data read from the main memory and processing requests from the instruction processor 301. The processing requests from the instruction processor 301 may, for example, be a data send request. Such a request is received first by the instruction processor interface 101 which then interprets the content of the request and sends it through a signal line L108 to the command data sending circuit 113.

A main memory interface 114 receives a request to access the main memory 306 from the instruction processor 301 and the network interface 305, transfers the request to the main memory 306, receives the result of the access, reading from the main memory, from the main memory 306, and sends it to where the request originated. Here, let us explain about the path involving the main memory in greater detail.

A main memory access request from the instruction processor 301 is first accepted by the instruction processor interface 101, from which it is transferred via signal link L102 to an access right control circuit 111, from which it is sent to the main memory interface 114. The result of this access, data read from the main memory 306, is transferred from the main memory 306 to the main memory interface 114, which then sends it via L101 to the instruction processor interface 101, from which it is transferred to the instruction processor 301.

A main memory access request from the network interface 305 is first accepted by the command data receiving circuit 110, which analyzes its content and sends it to a main memory access issue circuit 112, from which it is transferred through the access right control circuit 111 to the main memory interface 114. Then, the result of the access, data read from the main memory, is transferred from the main memory 306 to the main memory interface 114, from which it is sent to the command data sending circuit 113, which then transfers the data to the network interface 305.

As shown, the access right control circuit 111 is where the main memory access request from the instruction processor 301 and the main memory access request from the network interface 305 first meet. The access right control circuit sequences the main memory access requests from the instruction processor 301 and the network interface 305 that occurred arbitrarily and independently of each other. The order of accesses to the same address in the main memory 306 at least follows the order in which they were accepted by the access right control circuit.

Next, the coherence control, the subject of this invention, is described. The fundamental operation flow is as follows:

(1) When the network interface 305 receives data, the command data receiving circuit 110 accepts a request to write data in the main memory 306 from the network interface 305.

(2) The command data receiving circuit 110 issues a main memory write request to the main memory access issue circuit 112.

(3) At the same time that it performs the processing (2), the command data receiving circuit 110 also issues a cache coherence control request for the same address as the main memory write request to a cache coherence control processing circuit in the storage controller 304. Although the cache coherence control processing circuit is not shown in the storage controller 304 of FIG. 4, it is a function which makes use of a read address register 102, a cache coherence control request issue circuit 103, a cache coherence control request issue wait decision circuit 104, an address match monitor circuit 105, a cache coherence control request register 106, a cache coherence control request issue decision circuit 107, and an address register on receiving side 109. This circuit functions as an intermediate circuit between the command data receiving circuit 110 and the instruction processor interface 101.

(4) The cache coherence control processing circuit in the storage controller 304 sends a cache coherence control request to the instruction processor interface 101 as needed or at a timing described later.

(5) The instruction processor interface 101 issues a cache coherence control request to the instruction processor 301. In response to this request, the instruction processor 301 performs the cache coherence control. Because this embodiment assumes a store through type cache memory, the write data to the cache memory 302 is always reflected on the main memory 306; the cache coherence control in this case therefore is a cache purge processing that invalidates a cache entry.

Next, the configuration and operation of the cache coherence control processing circuit in the storage controller 304 will be explained below.

The read address register 102 is a register to hold an address for a cache line read operation being processed by the storage controller 304. The cache line read is processing that reads from the main memory a series of continuous address locations, called a cache line that is a management unit of the cache memory 302 used by the instruction processor 301. When target data sought by a read instruction from the instruction processor 301 does not exist in the cache memory 302, the cache line read request is issued from the instruction processor 301 to the storage controller 304. The read address register 102 has, in addition to the field for holding a cache line read address, a validity bit field which indicates whether the cache line read operation for the address held in the read address register 102 continues in the storage controller 304.

The instruction processor interface 101, upon receiving a cache line read request from the instruction processor 301, generates a required number of main memory read requests to read all of the cache line and sends them successively to the access right control circuit 111. When the first main memory read request is accepted by the access right control circuit, this marks the beginning of the read operation for the cache line in the storage controller 304. At this point, the instruction processor interface 101 puts a read address for the cache line on signal line L104 to set it in the read address register 102 and at the same time sets information representing "valid" (for instance, "1") in the validity bit field of the read address register 102 through signal line L103. When a plurality of results of the main memory read generated by the instruction processor interface 101 as a result of the cache line read operation are all transferred to the instruction processor 301, the read operation for the cache line is complete. At this point, the instruction processor interface 101 sets information representing "invalid", an inverted value from the "valid"-signifying value; in the preceding example, "0", in the validity bit field of the read address register 102 through signal line 2103. In this way, the read address register 102, when its validity bit field is "valid," indicates that the storage controller 304 is currently processing the cache line read operation, with a value in the field holding the cache line read address representing the address currently being read.

The address register on receiving side 109 has a field for holding the address for the previous cache coherence control request and a validity bit field. The command data receiving circuit 110, upon receiving a main memory write request from the network interface 305, issues a main memory write request to the main memory access issue circuit 112 and at the same time issues a cache coherence control request to the cache coherence control request issue decision circuit 107 through signal line L117. The cache coherence control request issue decision circuit 107 compares the address for the cache coherence control request with the content of the receive side address register 109 transferred through signal line L114. If the validity bit field of the address register on receiving side 109 is "valid" and the content of the field that holds the address for the previous cache coherence control request agrees with the current requested address transferred through signal L117, it is guaranteed that the cache line in question does not exist on the cache memory 302 of the instruction processor 301.

The cache coherence control request issue decision circuit 107 therefore cancels the present cache coherence control request and notifies this cancel to the command data receive circuit 110 through signal line L120. The command data receive circuit 110 interprets this notification to mean that the cache coherence control associated with the current main memory write operation has finished, and proceeds to process a new main memory write request. If, on the other hand, the cache coherence control request issue decision circuit 107 decides that the validity bit field of the address register on receiving side 109 is "invalid" or that the content of the field of the address register on the receiving side 109 holding the address for the previous cache coherence control request does not match the currently requested address, which was transferred through signal line L117, the cache coherence control request issue decision circuit 107 accepts the cache coherence control request.

Thereafter the cache coherence control request issue decision circuit 107 registers the cache coherence control request with the cache coherence control request register 106, sets the valid bit of the register 106 to "valid" and notifies this to the command data receive circuit 110 through signal line L120.

The command data receiving circuit 110, upon receiving the above-described notification, sets the address for the current cache coherence control request in the address register on the receiving side 109 and at the same time sets the validity bit field of the address register 109 to "valid". The command data receiving circuit 110 also interprets this notification to mean that the cache coherence control associated with the current main memory write operation has finished and proceeds to process a new main memory write request. The above-mentioned address comparison is performed by comparing the start address of the cache line to which the current requested address belongs to the address for the previous cache coherence control request.

The validity bit field of the address register on the receiving side 109 has an "invalid" value as an initial value. The validity bit field of the address register 109 is set to "valid" only when the cache coherence control request issue decision circuit 107 accepts the cache coherence control request and the command data receiving circuit 110 makes setting according to the request, as described above. The validity bit field of the address register 109 is reset only when the address match monitor circuit 105 detects a state in which the content of the field of the address register 109 holding the address for the previous cache coherence control request which is received through L114 coincides with the content of the field of the read address register 102 holding the cache line read address, which is received through L110 and in which both the validity bit fields of the address register 109 and the read address register 102 are "valid." The resetting is done by the address match monitor circuit 105 through L112.

The control involving the validity bit field of the address register on the receiving side 109 ensures the validity of the processing performed by the cache coherence control processing circuit in the storage controller 304, enhances the efficiency of the cache coherence control itself, and prevents an unwanted overhead and a processing bottle neck from being generated in the program execution by the instruction processor 301 and in the data transfer performed by the inter-processor network 202. The validity bit field of the address register 109, when it is "valid," guarantees that the cache line of the address specified by the content of the field of the address register 109 that holds the address for the previous cache coherence control request does not exist in the cache memory 302 of the instruction processor 301. If the validity bit field of the address register 109 is "valid," the cache coherence control has been performed at least once on the address specified by the content of the field of the address register 109 holding the address for the previous cache coherence control request. As a result of the cache coherence control performed once, the cache line for the requested address was eliminated from the cache memory 302 of the instruction processor 301.

Further, the validity bit field of the address register 109 continuing to be "valid" ensures that the cache line that was previously lost has not yet started to be read. If this cache line has already started to be read, the address to be read ought to be set in the read address register 102 and the validity bit field of the read address register 102 is set with the "valid" bit. This state is the state that satisfies the requirement for the address match monitor circuit 105 to reset the value of the validity bit field of the address register 109.

Hence, the fact that the validity bit field of the address register 109 continues to be "valid" guarantees that the cache line of the address specified by the content of the field of the address register 109 holding the address for the previous cache coherence control request does not exist in the cache memory 302 of the instruction processor 301 nor has been read since. This guarantee, as mentioned above, allows the cache coherence control request issue decision circuit 107 to cancel the cache coherence control request in a case where the validity bit field of the address register 109 is "valid" and the address for the current cache coherence control request, which is received through signal line L117 agrees with the content of the field of the address register 109 holding the address for the previous cache coherence control request, which is received through signal line L114. This control is advantageous for data transfer in the message passing type parallel processor system and enhances the processing efficiency.

The data transfer in the message passing type parallel processor system transfers a large volume of data in the ascending order of read/write destination addresses. These addresses are mostly contiguous. Under this situation, during the data reception, main memory write requests involving the same cache line area occur successively. Considering this fact, it is understood that the cache coherence control does not need to be issued for all the write requests for one and the same cache line area but basically needs to be issued for only the first write request as long as a cache line read request from the instruction processor 301 does not occur during the process. The configuration of the present invention implements the above processing and thus can enhance the efficiency of data transfer.

Conversely, if the validity bit field of the address register on the receiving side 109 is "valid" and the read operation has started to be performed on the cache line of the address specified by the content of the field of the address register 109 holding the address for the previous cache coherence control request, the cache line in question will in due course exist in the cache memory 302 of the instruction processor 301. Accordingly, the cache coherence control requests for the addresses of the cache line area in question that occurred after the cache line read had started the order of the requests is controlled by the access right control circuit 111 accepting or rejecting the accesses as described above must be notified to the instruction processor 301 after the cache line is registered in the cache memory 302 of the instruction processor 301. The processing in which the address match monitor circuit 105 resets the validity bit of the address register 109 to "invalid" is the control to ensure that the cache coherence control requests that occurred at such a timing can be issued without being canceled. In this case, the sequence control to transfer the cache coherence control request for the address of the cache line area to the instruction processor 301 after the cache line is registered in the cache memory 302 of the instruction processor 301 is performed by the cache coherence control request issue wait decision circuit 104.

While recognizing the operation of the instruction processor 301 in addition to the sequence control described above, the cache coherence control request issue wait decision circuit 104 knows via signal line L111 the presence of the cache coherence control request in the cache coherence control request register 106 and controls the timing at which to issue the cache coherence control request to the instruction processor 301.

If the instruction processor 301 has issued a cache coherence control request issue inhibit signal or if other transactions are issued to the instruction processor 301 or data transfer is being performed on it, the instruction processor interface 101 puts an inhibit signal on the signal line L105 and informs this status to the cache coherence control request issue wait decision circuit 104. Upon receiving this inhibit signal, the cache coherence control request issue wait decision circuit 104 controls the cache coherence control request issue circuit 103 by the control line L109 to prevent it from issuing the cache coherence control request. At the same time, the cache coherence control request issue wait decision circuit 104 inhibits, through signal line L116, the command data receive circuit 110 from generating the cache coherence control request. The command data receiving circuit 110, after receiving this inhibition, refrains from issuing the cache coherence control request even when so allowed by the cache coherence control request issue decision circuit 107. It is noted, however, that when the cache coherence control request is canceled by the cache coherence control request issue decision circuit 107, the command data receiving circuit 110 operates without being restricted by the cache coherence control request issue wait decision circuit 104.

When the cache coherence control request issue wait decision circuit 104 decides that the content of the validity bit field of the read address register 102 transferred via the signal line L110 is "valid" and that the content of the field of the read address register 102 holding the cache line read address and the content of the cache coherence control request register 106 which is transferred via the signal line L111 agree in their address information, the cache coherence control request issue wait decision circuit 104 inhibits the issuing of the cache coherence control request until, as described above, the content of the validity bit field of the read address register 102 is reset to be "invalid" by the instruction processor interface. This inhibit control is similar to the control according to the inhibition of signal line L105.

When the above inhibit state is not established in the cache coherence control request issue wait decision circuit 104, the cache coherence control request can be issued. In this state, if a cache coherence control request exists in the cache coherence control request register 106, the cache coherence control request issue circuit 103 reads the request via the signal line L111 and transfers it through the signal line L106 to the instruction processor interface 101. The instruction processor interface 101 sends this request as a transaction to the instruction processor 301, which in turn executes the cache coherence control. Described above is the configuration of the First Embodiment of the present invention.

Variation 1 of the First Embodiment

The first embodiment of the present invention concerns the configuration where the instruction processor 301 adopts the store through type cache memory 302. The Variation 1 employs the copy back system for the cache memory 302 and its configuration is explained by referring to FIG. 1.

If the copy back method is employed for the cache memory 302, when the instruction processor 301 requests the network interface 305 to start sending data to other processor elements 201, there is a possibility that the data to be sent out may differ between the main memory 306 and the cache memory 302. In this case, the latest content of data exists on the cache memory 302, so that the data to be sent out needs to be copied back from the cache memory 302 to the main memory 306. This is where the Variation 1 differs greatly from the preceding First Embodiment. To realize this control, a cache coherence control processing circuit in the storage controller 304 of FIG. 1 not illustrated by name in FIG. 1, as in FIG. 4, includes an address register on the sending side 108 in addition to elements illustrated in FIG. 4. This control mechanism will be described in detail below.

For the data reception, too, the cache coherence control needs to be carried out between the main memory 306 and the cache memory 302. The cache coherence control requires an additional processing of copying data on the cache memory 302 back to the main memory 306. Hence, the control mechanism slightly differs from that of the First Embodiment.

In this variation, too, as in the First Embodiment, the operations associated with the I/O interface 303 are omitted from description as they are not relevant to the subject of this invention. Also in FIG. 1 the processing components associated with the I/O interface 303 are not illustrated.

Figure 1:
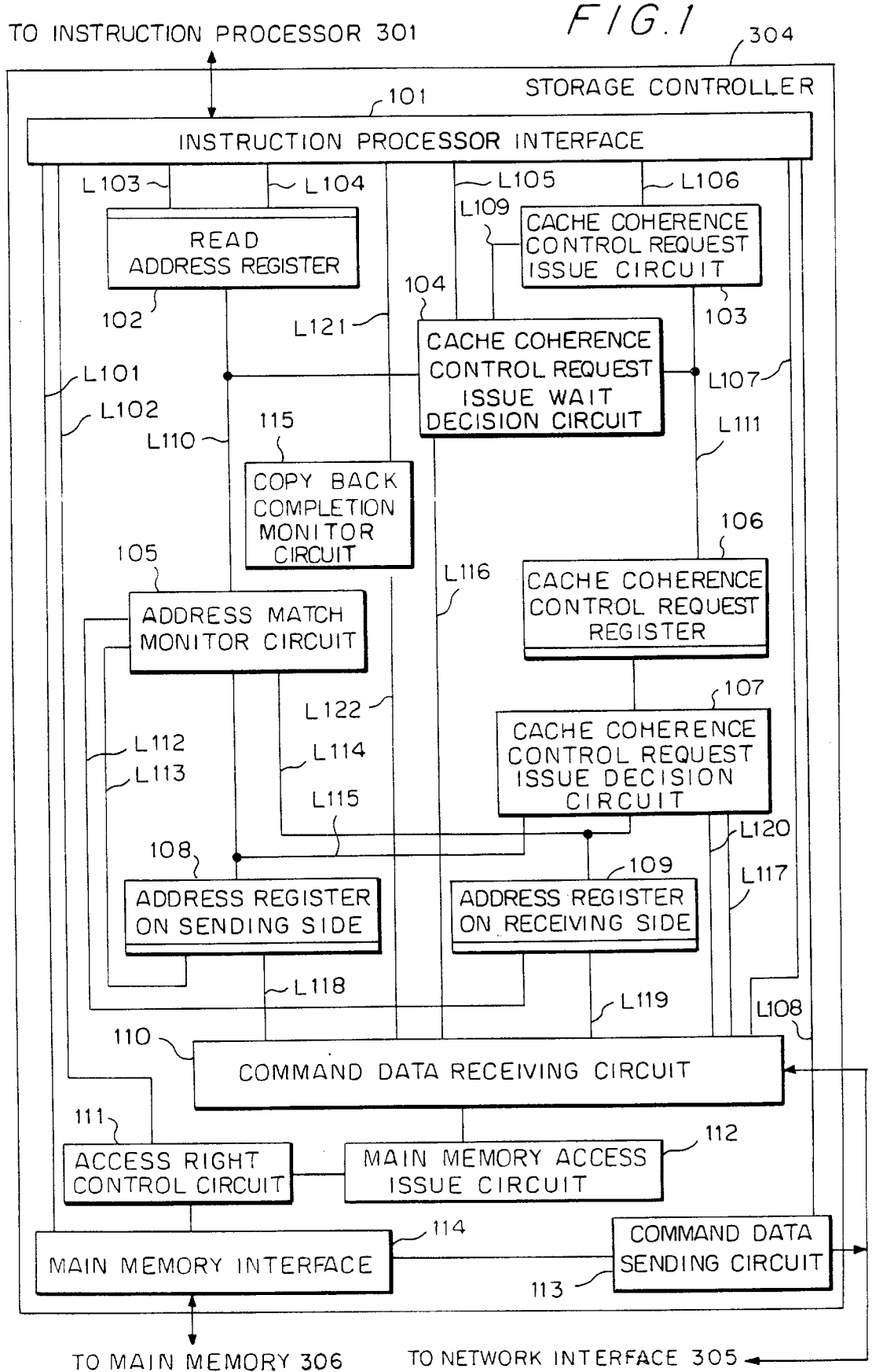
FIG. 1 is a block diagram illustrating the configuration of the storage controller of the present invention.

In FIG. 1, the components of the storage controller 304 are similar in functions, roles and configurations to those of the First Embodiment illustrated in FIG. 4. The components are an instruction processor interface 101, an access right control circuit 111, a main memory interface 114, a command data receive circuit 110 a main memory access issue circuit 112, a command data sending circuit 113, and a cache coherence control processing circuit which includes a read address register 102, a cache coherence control request issue circuit 103, a cache coherence control request issue wait decision circuit 104, an address match monitor circuit 105, a cache coherence control request register 106, a cache coherence control request issue decision circuit 107 and an address register 109 on the receiving side.

The difference of this variant from the first embodiment is that, for the processing of copying back data on the cache memory 302 to the main memory 306 as part of the cache coherence control, the cache coherence control processing circuit in the storage controller 304 is additionally provided with a copy back completion monitor circuit 115 and that the instruction processor interface 101 and the command data receiving circuit 110 have additional control operations associated with the copy back processing. Further, because, the cache coherence control is required not only during data reception but also during data sending, the cache coherence control processing circuit in the storage controller 304 has an additional circuit of the address register 108 on the sending side. This results in new control operations associated with data sending being added to the address match monitor circuit 105, the cache coherence control request issue decision circuit 107 and the command data receiving circuit 110.

As most of the components of the storage controller 304 are similar in control operations and mechanisms to those of the First Embodiment, this variant will be explained only in those points differing from the First Embodiment. First, the cache coherence control associated with the data send operation is explained. The basic operation flow is as follows.

(1) As the network interface 305 prepares sending data, the command data receiving circuit 110 accepts a request from the network interface 305 to read data from the main memory 306.

(2) The command data receiving circuit 110 issues a cache coherence control request for the same address as the read destination of the received main memory read request to the cache coherence control processing circuit in the storage controller 304.

(3) When the cache coherence control is decided to not be necessary, the cache coherence control processing circuit in the storage controller 304 informs such decision to the command data receiving circuit 110. When the cache coherence control is decided to be necessary, the cache coherence control processing circuit in the storage controller 304 informs such decision to the instruction processor interface 101 at a timing described below. The instruction processor interface 101 in turn issues a cache coherence control request to the instruction processor 301. The instruction processor 301 performs the cache coherence control according to this request. At this time, the instruction processor 301 executes the copy back processing as required (i.e., it successively issues requests for writing cache line data into the main memory 306). The instruction processor interface 101, after detecting the end of the copy back processing, described below, notifies the cache coherence control processing circuit in the storage controller 304 that the cache coherence control processing has ended. Then, this information is sent to the command data receiving circuit 110.

(4) When informed by the cache coherence control processing circuit in the storage controller 304 that the cache coherence control is not required or that the cache coherence control processing has ended, the command data receiving circuit 110 transfers the main memory read request to the main memory access issue circuit 112 and waits for the next request.

Next, we will explain the control operation performed by the cache coherence control processing circuit in the storage controller 304 in connection with the issuing of a cache coherence control request during data sending. The basic operation is almost the same as the control operation of the cache coherence control processing circuit in the storage controller 304 of the First Embodiment, except that the address register 108 on the sending side is used in place of the address register 109 on the receiving side. The address register 108 is similar in configuration to the address register 109 on the receiving side, and has a field for holding an address for the previous cache coherence control request, the command data receiving circuit 110 made by the previous data read operation at time of data sending, and a validity bit field. When the command data receiving circuit 110 receives a main memory read request from the network interface 305, the command data receiving circuit 110 issues a cache coherence control request to the cache coherence control request issue decision circuit 107 through the signal line L117. The cache coherence control request issue decision circuit 107 compares the requested address with the content of the address register on sending side 108 received through the signal line L115.

If the validity bit field of the address register on sending side 108 is "valid" and if the address of the current request received through signal line L117 agrees with the content of the field of the address register 108 holding the address for the previous cache coherence control request, it is guaranteed, as described in the First Embodiment, that the cache line to be controlled does not exist on the cache memory 302 of the instruction processor 301. Therefore, the cache coherence control request issue decision circuit 107 cancels the current cache coherence control request and gives this decision to the command data receiving circuit 110 via the signal line L120. The command data receiving circuit 110 interprets this signal to mean that the cache coherence control associated with the current main memory read operation is finished, and transfers the current main memory read request to the main memory access issue circuit 112 and waits for the next request.

If, on the other hand, the cache coherence control request issue decision circuit 107 decides that the validity bit field of the send side address register 108 is "invalid" or if the requested address, received via signal line L117, does not agree with the content of the field of the address register on the sending side 108 holding the address for the previous cache coherence control request, the cache coherence control request issue decision circuit 107 accepts the cache coherence control request, registers it with the cache coherence control request register 106, sets the validity bit of the cache coherence control request register 106 to the "valid" and informs this processing to the command data receiving circuit 110 via L120. Upon receiving this signal, the command data receiving circuit 110 sets the address of the current cache coherence control request in the address register 108 and at the same time sets a value representing "valid" in the validity bit field of the address register 108 and waits for a signal representing the end of the cache coherence control processing to be transferred here via signal line L122 the operation involving the signal line L122 will be described later. When it is informed via signal line L122 that the cache coherence control processing has finished, the command data receiving circuit 110 transfers the current main memory read request to the current main memory access issue circuit 112 and waits for the next request. The address comparison described above is done by comparing the start address of the cache line to which the requested address belongs to the address of the previous cache coherence control request contained in the address register on the sending side 108.

The control involving the validity bit field of the address register 108 on the sending side is similar to that of the address register 109 on the receiving side. First, the initial value is set to a value "invalid." The validity bit field of the address register 108 is set to "valid" only when the cache coherence control request issue decision circuit 107 accepts the cache coherence control request and the command data receiving circuit 110 makes setting according to the request, as described above. The validity bit field of the address register on sending side 108 is reset from "valid" to "invalid" only when the address match monitor circuit 105 detects a state in which the content of the field of the address register 108 holding the address for the previous cache coherence control request, which is received through signal line L115, coincides with the content of the field of the read address register 102 holding the cache line read address which is received through signal line L110 and in which both the validity bit fields of the address register 108 and the read address register 102 are "valid." The resetting is done by the address match monitor circuit 105 through signal line L113.

Next, the cache coherence control associated with the data receive operation is described below. The basic operation flow is as follows:

(1) When the network interface 305 receives data, the command data receiving circuit 110 accepts a request from the network interface 305 to write data into the main memory 306.

(2) The command data receiving circuit 110 issues a cache coherence control request for the same address as the write destination of the received main memory write request to the cache coherence control processing circuit in the storage controller 304.

(3) When cache coherence control is decided to not be necessary, the cache coherence control processing circuit in the storage controller 304 provides decision to the command data receiving circuit 110. When the cache coherence control is decided to be necessary. The cache coherence control processing circuit in the storage controller 304 provides such decision to the instruction processor interface 101 at a timing described later. The instruction processor interface 101 in turn issues a cache coherence control request to the instruction processor 301. The instruction processor 301 performs the cache coherence control according to this request. At this time, the instruction processor 301 executes the copy back processing as required (i.e., it successively issues requests for writing cache line data into the main memory 306). The instruction processor interface 101, after detecting the end of the copy back processing, described below, notifies the cache coherence control processing circuit in the storage controller 304 that the cache coherence control processing has ended. Then, this information is sent to the command data receiving circuit 110.

(4) When informed by the cache coherence control processing circuit in the storage controller 304 that the cache coherence control is not required or that the cache coherence control processing has ended, the command data receiving circuit 110 transfers the current main memory write request to the main memory access issue circuit 112 and waits for the next request.

The control operation performed by the cache coherence control processing circuit in the storage controller 304 in connection with the issuing of a cache coherence control request during the data receiving is almost the same as the control operation of the cache coherence control processing circuit in the storage controller 304 of the First Embodiment. The only difference is that when the command data receiving circuit 110 receives a main memory write request from the network interface 305, the command data receiving circuit 110 does not immediately transfer the write request to the main memory access issue circuit 112 but instead waits for the cache coherence control request issue decision circuit 107 to decide that cache coherence control is not necessary or for the cache coherence control processing to be completed. When, during data reception, it receives a main memory write request from the network interface 305, the command data receiving circuit 110 issues a cache coherence control request to the cache coherence control request issue decision circuit 107 through the signal line L117.

The cache coherence control request issue decision circuit 107 compares the requested address with the content of the address register 109 received through the signal line L114. If the validity bit field of the address register on the receiving side 109 is "valid" and if the address of the current request received through signal line L117 agrees with the content of the field of the address register 109 holding the address for the previous cache coherence control request, it is guaranteed, as described in the First Embodiment, that the cache line to be controlled does not exist on the cache memory 302 of the instruction processor 301. Therefore, the cache coherence control request issue decision circuit 107 cancels the current cache coherence control request and informs the command data receiving circuit 110 of this decision via the signal line L120. The command data receiving circuit 110 interprets this signal to mean that the cache coherence control invoked by the current main memory write operation is finished, and issues the current main memory write request to the main memory access issue circuit 112 and waits for the next request.

If, on the other hand, the cache coherence control request issue decision circuit 107 decides that the validity bit field of the address register on the receiving side 109 is "invalid" or if the requested address, received via signal line L117, does not agree with the content of the field of the address register 109 holding the address for the previous cache coherence control request, the cache coherence control request issue decision circuit 107 accepts the cache coherence control request, registers it with the cache coherence control request register 106, sets the validity bit of the cache coherence control request register 106 to the "valid" and informs this processing to the command data receiving circuit 110 via signal line L120. Upon receiving this signal, the command data receiving circuit 110 sets the address of the current cache coherence control request in the address register 109 and at the same time sets a value representing "valid" in the validity bit field of the address register 109 on the receiving side and waits for a signal representing the end of the cache coherence control processing to be transferred here via signal line L122. The operation involving signal line L122 will be described below. When it is informed via signal line L122 that the cache coherence control processing has finished, the command data receiving circuit 110 transfers the current main memory write request to the main memory access issue circuit 112 and waits for the next request. The address comparison described above is done by comparing the start address of the cache line to which the requested address belongs.

The control involving the validity bit field of the address register 109 on the receiving side is entire the same as that of the First Embodiment. The control performed by the cache coherence control request issue wait decision circuit 104 is the same as that of the First Embodiment in terms of the cache coherence control request associated with both data send and data receive operations.

Next, the wait control performed by the command data receiving circuit 110 when it waits for the end of the cache coherence control processing will be described. Once a cache coherence control request is accepted by the cache coherence control request issue decision circuit 107, the command data receiving circuit 110 waits for a signal representing the end of the cache coherence control processing to be transferred to it via signal line L122, whether during the reading of data to be sent from the main memory 306 or during the writing of received data into the main memory 306. The cache coherence control processing end information is placed on the signal line L122 by the copy back completion monitor circuit 115. The copy back completion monitor circuit 115 receives a cache coherence control processing completion signal from the instruction processor interface 101 via signal line L121. When the instruction processor interface 101 is notified by the instruction processor 301 that the cache coherence control request transaction that the interface itself has issued will be ended without copy back, or when the instruction processor interface 101 receives, in response to the cache coherence control request transaction that the interface itself has issued, the main memory write requests for the cache line as the copy back transaction from the instruction processor 301. These main memory write requests are all accepted by the access right control circuit 111. Then, the copy back completion monitor circuit 115 sends the completion signal to the command data receiving circuit 110 via signal line L122.

The above-described control guarantees that the access to the main memory 306 is made when the most recently updated data exists in the main memory 306.

Described above is the configuration of Variation 1 of the First Embodiment of the present invention.

Variation 2 of First Embodiment

The First Embodiment and its Variation 1 of the present invention have been described to perform the cache coherence control for all accesses from the network interface 305 to the main memory 306 as requested by the data send or receive operation.

Depending on the nature of a program or algorithm, there are cases where such a cache coherence control by hardware is not necessary or a cache coherence control may be better performed by software for improved processing efficiency. In such cases, if the cache coherence control is performed by hardware in the same way in a variety of situations, the overhead may degrade the processing performance of the program. Taking this factor into consideration, the Variation 2 classes transactions, which are made by the network interface 305 to the command data receiving circuit 110 in the storage controller 304 requesting access from the network interface 305 to the main memory 306 into largely two kinds of transactions. A first type of transaction making main memory read/write requests "requiring a cache coherence control" and a second type of transaction making main memory read/write requests "requiring no cache coherence control."

When a transaction for making a main memory read/write request requiring the cache coherence control is received, the command data receiving circuit 110, as described in the First Embodiment and the Variation 1, issues a cache coherence control request to the cache coherence control processing circuit in the storage controller 304 and, according to the control, issues a main memory access request to the main memory access issue circuit 112. When a transaction for making a main memory read/write request requiring no cache coherence control is received, the command data receiving circuit 110 does not issue any control request to the cache coherence control processing circuit in the storage controller 304 but instead issues the main memory access requests received to the main memory access issue circuit 112 one after another regardless of the cache coherence control.

As to the control for selecting the type of transaction, one requiring the cache coherence control or one not requiring cache coherence control, when the network interface 305 sends its main memory access request to the storage controller 304, there is the following procedure is used to realize such a control.

(1) Information indicating whether or not the cache coherence control is required is embedded, when transfer data is received, as one control information in a packet header, which is attached to the transfer data when it is transferred. The network interface 305 determines which type of transaction, one requiring the cache coherence control or one not requiring cache coherence control, to be issued according to the information bit in the packet header of the received packet.

(2) Whether the cache coherence control is required or not is specified by control information on a buffer area on the main memory 306 that stores data received or to be sent. The network interface 305, prior to transmission and reception of data, reads the control information on the buffer area and makes a decision on whether the cache coherence control is required or not before determining which type of transaction, one requiring the cache coherence control or one not requiring cache coherence control, shall be issued according to the result of the decision.

(3) A control register specifying whether the cache coherence control is required or not is prepared in the network interface 305 and, prior to data transfer, the "required/not required" setting regarding the cache coherence control is set in the register. As the data transfer proceeds, the network interface 305 determines, according to the content of the register, which type of transaction, one requiring the cache coherence control or one not requiring cache coherence control, should be issued.

The control in the network interface 305 can be realized with a range of conventional technology dealing with other control information such as data length control and transfer mode control in connection with data transfer, and its explanation is therefore omitted. An essential point of the Variation 2 is that a new item specifying whether the cache coherence control is required or not in connection with data transfer is added as data transfer-related control information.

In the data transfer performed in a message passing type parallel processor system, the present invention, in parallel with transmission and reception of the data, automatically performing by hardware a cache coherence control for address locations of the source and destination of main memory accesses occurring with a transfer of data. Taking advantage of the fact that the message passing type data transfer handles data in continuous address locations, the present invention makes the number of times that the cache coherence control request is issued to the instruction processor basically only once for each cache line, a unit for registration with the cache memory. This arrangement eliminates overhead of software involving cache coherence control, which is encountered in the data transfer operation in the conventional message passing type parallel processor system, thereby improving the efficiency of data transfer including the cache memory control and alleviating limitations imposed on a program.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A message passing parallel processor system with distributed memory, comprising:

a plurality of processor elements, each having an instruction processor, a main memory which performs memory access in response to a memory access request informed thereto, a cache memory used to improve efficiency of access to the main memory, wherein data is written into said cache memory and when a copy back is requested data in said cache memory is written into said main memory, and wherein said instruction processor performs cache purge processing in response to a cache coherence control request informed thereto; and a inter-processor network which interconnects said processor elements;

wherein, each of said processor elements further includes:
an address register which stores main memory addresses, copies of memory data thereof having being purged from said cache memory due to cache coherence control requests previously issued, a coherence control request issue circuit which issues a cache coherent control request to said instruction processor when a local processor element receives through said inter-processor network a message including data to be stored in said main memory through said inter-processor network and when a destination address of said data is not included in said main memory addresses stored in said address register, and a memory access request issue circuit which issues a write request to the main memory when the local processor element receive the message including the data to be stored in said main memory.

2. A message passing parallel processor system according to claim 1, further including, in each of said processor elements, means for invalidating a main memory address stored in said address register when memory data of said main memory address starts to be copied again to said cache memory.

3. A message passing parallel processor system with distributed memory, comprising:

a plurality of processor elements, each having an instruction processor, a main memory which performs memory access in response to a memory access request informed thereto, a cache memory used to improve efficiency of access to the main memory, wherein data is written into said cache memory and said main memory at the same time and wherein said instruction processor performs flush processing, which include a first step of copying back the data in said cache memory to said main memory and a second step of erasing the data in said cash memory, in response to a cache coherence control request informed thereto; and a inter-processor network which interconnects said processor elements;

wherein, each of said processor elements further includes:
a receiving address register which stores main memory addresses, copies of memory data thereof having been erased from said cache memory due to cache coherence control requests previously issued, a coherence control request issue circuit which issues a cache coherent control request to said instruction processor when a local processor element receives through said inter-processor network a message including data to be stored in said main memory and when a destination address of said data is not included in said main memory addresses stored in said receiving address register, and a memory access request issue circuit which issues a write request to the main memory when the local processor element receives the message including the data to be stored in said main memory and a copy back of cache data corresponding to said data to be stored in said main memory is completed.

4. A message passing parallel processor system according to claim 3, further including, in each of said processor elements, means for invalidating a main memory address stored in said receiving address register when memory data of said main memory address starts to be copied again to said cache memory.

5. A message passing parallel processor system with distributed memory, comprising:

a plurality of processor elements, each having an instruction processor, a main memory which performs memory access in response to a memory access request informed thereto, a cache memory used to improve efficiency of access to the main memory, wherein data is normally written into said cache memory and when a copy back is requested data in said cache memory is written into said main memory, and wherein said instruction processor performs flush processing, which includes a first step for copying back the data in said cache memory to said main memory and a second step for erasing the data in said cash memory, in response to a cache coherence control request informed thereto; and a inter-processor network interconnecting said processor elements;

wherein each of said processor elements further includes:
a sending address register which stores main memory addresses, copies of memory data thereof having been erased from said cache memory due to cache coherence control requests previously issued, a coherence control request issue circuit which issues a cache coherent control request to said instruction processor when a local processor element is to read out and send a data read from said main memory and when read address of said data is not included in said main memory addresses stored in said sending address register, and a memory access request issue circuit which issues a read request to the main memory when the local processor element is to read out and send the data from said main memory and a copy back of cache data corresponding to the data to be sent is completed.

6. A message passing parallel processor system according to claim 5, further including, in each of said processor elements, means for invalidating a main memory address stored in said sending address register when memory data of said main memory address starts to be copied again to said cache memory.

* * * * *